United States Patent Office 3,124,518
Patented Mar. 10, 1964

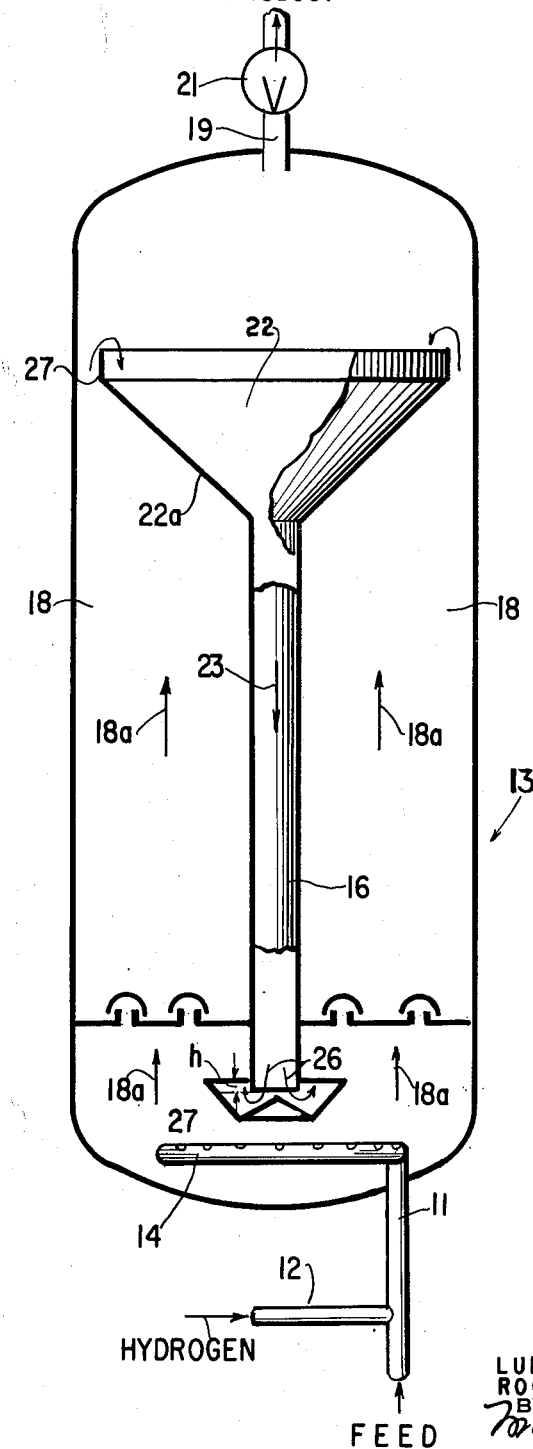

3,124,518
APPARATUS FOR TREATMENT OF
LIQUID WITH GAS
Luis H. Guzman, Sulphur, and Roger P. Van Driesen,
Lake Charles, La., assignors to Cities Service Research
and Development Company, New York, N.Y., a corporation of New Jersey
Filed May 29, 1961, Ser. No. 113,239
4 Claims. (Cl. 196—46)

This invention relates to treatment of liquid with gas and more particularly to recycling of liquid in processes for the treatment of liquid hydrocarbon oil with gas. The invention has particular application to the treatment of liquid hydrocarbon oils with hydrogen.

In the treatment of liquid hydrocarbon oils with hydrogen, it is common practice to pass the liquid feed together with hydrogen upwardly through a reaction zone under appropriate operating conditions to obtain the desired hydrogenation reaction. Since hydrogenation reactions are exothermic, some provision must be made for cooling the material within the reaction zone in order to maintain temperatures at the desired levels. One method of controlling temperature in the hydrogenation zone is to cool the contents of the reactor by the use of cooling coils within the reaction vessel or by withdrawing a stream from the reaction zone, cooling it and then returning it to the hydrogenation zone. Another method is to supply the feed to the hydrogenation zone at a temperature lower than the desired temperature in the hydrogenation zone. This method is generally preferable to direct cooling of the reactor contents. Unfortunately, since hydrogenation is an exothermic reaction, it is impossible to obtain the desired temperature throughout the entire hydrogenation zone merely by controlling the temperature of the feed and hydrogen entering the reaction zone. If the temperature of the feed and hydrogen is such as to produce the desired reaction temperature in the portion of the hydrogenation zone to which the feed and hydrogen is fed (the bottom of the reactor in a normal upflow reactor), then the exothermic hydrogenation reactions will result in the temperatures in the upper portion of the reactor being excessively high. Conversely, if the temperature of the feed or hydrogen entering the reactor is too low, the temperature in the lower part of the reactor will be insufficient to attain the desired hydrogenation reactions. In order to reduce this temperature difference within the reactor it has been found possible to recycle the contents of the reactor from top to bottom at a relatively high rate. In this manner the temperature spread within the reactor may be kept within reasonable limits.

The use of conventional recycle lines and pumps for recycling material within hydrogenation reactors at the high rates desired in order to maintain proper temperature control as described above has several marked disadvantages. These include not only the high cost of recycle pumps capable of handling the high volumes of recycle liquid required, but also attendant heat losses from the conventional external recycle lines and severe erosion of valves, pumps, etc., when solids are present in the system.

It is an object of the present invention to provide an improved process for the hydrogenation of hydrocarbon oils.

A further object of the invention is to provide an improved process for recycling liquid in a process for the treatment of liquid with gas.

Another object of the invention is to provide improved apparatus for the treatment of liquid hydrocarbon oil with gas.

It has now been discovered that when liquid is being treated by contact with gas, such as in the treatment of hydrocarbon oil with hydrogen in an upflow reactor, efficient recycle can be induced by allowing liquid substantially free of gas to be recycled downwardly through a cycle conduit with the circulation being maintained by the difference in density between the liquid substantially free of gas in the recycle conduit and the liquid containing gas in the reaction zone.

For a better understanding of the invention reference should be had to the accompanying drawing which is a somewhat diagrammatic illustration with equipment shown in elevation of apparatus suitable for carrying out a preferred embodiment of the invention as applied to the hydrogenation of liquid hydrocarbon oil.

In the drawing, feed oil entering through a conduit 11 and hydrogen entering through a conduit 12 pass through the conduit 11 into the lower portion of a reaction vessel 13. Hydrogen introduced through the conduit 12 may be pure hydrogen or may conveniently be hydrogen-containing gas such as recycle gas containing hydrogen as well as normally gaseous hydrocarbons and possibly inert gases such as nitrogen. The feed and hydrogen entering through the conduit 11 are preferably distributed throughout at least a substantial portion of the cross sectional area of the reaction vessel 13 by suitable means such as a conventional distributing ring 14. Hydrogen and feed from the distributing ring 14, together with recycle liquid obtained from a recycle conduit 16 as described below, preferably pass through suitable distributing means, such as a conventional bubble cap tray 17, for insuring even distribution of liquid and gas throughout the cross sectional area of the reactor and pass upwardly through a hydrogenation zone 18 of the reaction vessel 13 as indicated by arrows 18a. Hydrogen and gaseous and liquid product may be removed from the upper portion of the reaction vessel 13 as by a conduit 19 and valve 21. A gas disengaging zone 22 in the upper portion of the reaction vessel 13 allows liquid substantially free of gas to be recycled through the conduit 16 as indicated by an arrow 23. This recycle circulation is maintained by the greater density of the liquid substantially free of gas in the conduit 16 as opposed to the relatively lesser density of the mixture of liquid and gas flowing upwardly through the remainder of the reaction vessel as indicated by the arrows 18a. Liquid from the recycle conduit 16 is preferably deflected in an upward direction by suitable means such as a recycle cup 24 (as indicated by arrows 26) and becomes mingled with the feed and hydrogen introduced through the distributing ring 14 as described above.

The feed introduced to the conduit 11 as described above may be any suitable liquid hydrocarbon oil and may vary considerably depending upon the particular treatment desired. Hydrogenation reactions may for instance vary from relatively mild treatments under relatively lower conditions of temperature and pressure to more severe treatments under relatively higher conditions of temperature and pressure. Mild treatment with hydrogen may be used for instance to achieve improved color or stability and is frequently used to treat relatively light oils such as gas oil while more severe treatments may be used to effect hydrodesulfurization or hydrocracking and are more usually practiced on heavier feeds such as heavy crude oils or residual fractions.

Liquid and gas may be flowed upwardly through the reaction vessel 13 at any suitable velocity such as between about 3 and about 120 gallons per minute per square foot including both fresh feed and recycle. Likewise, the quantity of liquid recycled through the conduit 16 may vary widely such as between about 1 and about 60 times the volume of feed oil introduced through the conduit 11.

The velocity of the liquid in the recycle conduit is preferably maintained between about 3 and about 10 feet per second. Recycle rates of between about 5 and about 25 volumes of recycle liquid per volume fresh feed are generally preferred. The space velocity in the reaction vessel 13 may vary widely such as between about 0.5 and about 6.0 volumes of feed per hour per volume of reactor capacity with space velocities of between about 1 and about 3 volumes per hour per volume being preferred. The space velocity, like other operating conditions discussed herein, is not, however, completely independent and should be selected with other desired operating conditions in mind. For instance, the size of the reactor, the recycle ratio, the space velocity and the velocity with which liquid is flowed upwardly through the reactor effect one another and the effects of all of these factors must be taken into consideration in selecting the optimum conditions of operation. Hydrogen is introduced through the conduit 12 in quantities suitable to the particular reaction taking place in the reaction vessel 13 and may for instance be introduced at rates of between about 1000 and about 10,000 standard cubic feet per barrel of feed with hydrogen rates between about 2,500 and about 5,000 standard cubic feet per barrel of feed being preferred. The reaction vessel 13 may be maintained under any suitable pressures such as between about 500 and about 3,000 p.s.i.g. partial pressure of hydrogen with between about 1,000 and about 2,000 p.s.i.g. being preferred. Temperatures in the reaction vessel 13 may range between about 750° and about 950° F. depending upon the particular hydrogenation reactions desired and the other operating conditions chosen with temperatures between about 800° and about 900° F. being preferred. As mentioned above, it is generally desirable to maintain the temperature over substantially the entire reaction zone as close to the desired temperature as possible in any given situation. Due to the highly exothermic nature of the hydrogenation reaction the normal tendency is for the temperature in the upper portion of the reactor to be considerably higher than that in the lower portion of the reactor due to the additional hydrogenation reactions taking place as the feed rises through the reactor. Without substantial recycle the temperature difference in the reaction vessel 13 might well be as much as 50° or 100° F. By recycling liquid within the reactor as described herein the temperature difference can be substantially reduced. For instance, with recycle rates of about 20 to 1 based on feed the temperature difference in the reactor 13 would be only about 5° F. in a full size commercial unit. When the temperature difference within the reactor is controlled in this manner the temperature can be readily controlled by controlling the temperature at which the fresh feed and hydrogen are introduced into the reaction vessel. For instance, the feed may be brought into the reactor at a temperature some 100 to 200° F. lower than the contents of the reactor and immediately mixed with the liquid contents of the reactor by the high recycle rate. This results in the fresh feed being almost immediately elevated to proper reaction temperature while the reactor contents are prevented from attaining undesirably high temperatures.

While the present invention is useful in the hydrogenation of a wide range of feed stocks it is especially useful in hydrocracking relatively heavy feedstock to convert the heavier portions of the same into lighter, more useful material. For instance, apparatus of the type shown in the drawing may conveniently be used as described herein to hydrocrack feedstock a substantial portion of which, such as about 50% by volume, boils above 975° F. to convert suitable amounts of the same, such as between about 60% and about 95% of such material boiling above 975° F., to material boiling less than 975° F. Economic considerations such as hydrogen consumption will normally dictate a conversion of between about 60% and about 85% of the high boiling material into such lighter material even though higher conversions are entirely feasible using the operating conditions described herein.

As mentioned above, successful recycle of liquid through the conduit 16 in accordance with the present invention depends entirely upon the liquid in the conduit 16 having a greater density than the material in the remainder of the reaction vessel 13 surrounding the conduit 16. In order to maintain a sufficient density difference, it is necessary that the liquid in the recycle conduit 16 contain substantially less gas than the material in the remainder of the reaction vessel. The maximum recycle rate obtainable in any given situation thus depends in large part upon the relative amounts of gas present in the recycle line 16 and in the remainder of the reaction vessel. It is preferred that the liquid passing downwardly through conduit 16 be substantially free of gas. In order to achieve maximum disengagement of gas from recycle liquid, it is preferred that the upper end of the recycle conduit be provided with an enlarged gas disengaging zone such as the disengaging zone 22. In the form shown in the drawing the disengaging zone 22 is formed by a member 22a forming an enlarged upper end of the recycle conduit 16. The member 22a preferably has a relatively small vertical lip portion 27 at its upper edge. The lip 27 is provided in order to make maximum use of the area of the reaction vessel 13 taken up by the disengaging zone in view of the fact that the majority of the gas is disengaged from the liquid relatively close to the upper edge of the disengaging zone. It should be understood, however, that a suitable disengaging zone of enlarged cross sectional area may take any desired shape. While it is possible to obtain minimum induced recycle without the use of an enlarged disengaging zone such as 22, the limiting factor in obtaining maximum induced recycle as described above is usually the relative size of the cross sectional area of the upper portion of the disengaging zone as compared with that of the reaction vessel. A disengaging zone of too small a size for the desired recycle rate will result in contained gas being carried down into the recycle pipe where smaller bubbles tend to coalesce into larger bubbles which then force their way upwardly past downflowing liquid and act to reduce the effective recycle rate. Also, of course, if gas bubbles are carried too far down the recycle pipe so that the overall concentration of gas in the recycle conduit rises too high, the net effect will be to decrease the density of the liquid in the recycle conduit thereby reducing the density difference available to induce or maintain circulation of the recycle stream. In the use of apparatus such as that shown in the drawing it has been found that the cross sectional area of the disengaging zone (in this case taken at the top edge of the lip 27) should be at least about 1/5 of the total cross section area of the reaction vessel 13 in order to obtain a preferred recycle rate of at least 5 times the feed rate. The maximum recycle rate obtainable has been found to vary directly with the ratio of the cross sectional area of the disengaging zone to the cross sectional area of the reactor.

While the area of the gas disengaging zone generally limits the maximum recycle obtainable as described above, the recycle conduit must, of course, have sufficient cross sectional area to handle the recycle stream at the desired rate without excessive throttling. If the recycle conduit is too small the pressure drop caused by the throttling effect will act to offset the driving force available due to the density difference the liquid in the recycle conduit and the material in the remainder of the reactor as described above and will reduce the amount of the recycle obtainable with a given sized disengaging area. On the other hand, a recycle conduit which is unduly large may reduce the effective reactor volume available for the hydrogenation reaction to an undesirable extent. While size of the recycle conduit is not critical to the invention, the recycle conduit such as the conduit 16 shown in the drawing generally has a cross sectional area 1/100 to 1/5 that of the cross sectional area of the reaction vessel, preferably 1/50 to 1/10 of the cross sectional area of the reaction vessel.

Suitable means, such as the recycle cup 24, are preferably provided for shielding the lower end of the recycle conduit against entry of gaseous material. While such shielding is not absolutely essential to the operation of the recycle conduit, it is frequently necessary to provide some means for preventing entry of gas into the bottom of the recycle line during startup of the reactor. Once recycle has been established, it is possible to maintain the recycle without such shielding since the downflowing liquid in the recycle conduit tends to prevent gas from entering the bottom of the recycle conduit. A shielding member such as the recycle cup 24 may take any suitable shape such as that shown in the drawing. Such shielding means may for instance have a conventional cup shape or may merely be in the form of a simple cone or inverted cone designed to deflect upflowing gas away from the bottom of the recycle conduit. The general form of recycle cup shown in the drawing has the advantage of preventing buildup of solids in the cup and deflects the liquid from the recycle line into an upward direction for passage through the reaction vessel together with the fresh feed and hydrogen. The upper edge of the recycle cup preferably extends upwardly above the bottom of the recycle conduit for a height $h$ as indicated in the drawing. This height is preferably sufficient so that the depth of liquid in the recycle cup above the bottom of the recycle conduit is sufficient to resist the back pressure caused by the pressure drop across the bubble cap plate 17. This precludes the possibility that gas might be forced into the bottom of the recycle conduit by back pressure caused by the plate 17. The recycle cup 24 may if desired be vertically adjustable so that the recycle rate may be varied by restricting flow of liquid from the bottom of the recycle conduit in order to reduce the recycle rate below that for which the apparatus is designed.

As indicated in the drawing, it is preferred that the recycle conduit be placed entirely within the hydrogenation reactor and be substantially vertical. While it is possible to operate the induced recycle of the present invention with an external recycle line, an internal conduit such as the conduit 16 shown in the drawing has several advantages over a similar externally situated line. Since the conduit 16 is entirely within the reaction vessel 13 the conduit need not be capable of withstanding any significant internal pressures whereas an external recycle conduit would have to be of high pressure construction similar to that of the reaction vessel itself. Also, by maintaining the recycle conduit entirely within the reactor the recycle residence time of the liquid is reduced thereby resulting in more efficient operation. In addition, the internal recycle conduit does not result in any heat loss from the reactor whereas considerable heat loss is necessarily experienced with any external recycle line. While a substantially vertical recycle conduit is preferred, it is obvious that any recycle conduit in which the relatively denser recycle liquid may pass from the upper portion of the treating zone to the lower portion thereof by reason of such density difference may be used in practicing the invention.

While the invention has been described above in conjunction with the treatment of liquid hydrocarbon oil in the absence of solids, it should be understood that solids may be present in the system in accordance with the present invention. Solids present in hydrogenation or other treating systems of the present invention may include for instance, catalyst, contact particles or solids present in the feed material. For instance, the ash content of some residual or crude feeds may tend to build up in the reactor until a point is reached at which a considerable volume of solids is present in the reactor. Also, certain feeds such as crude oil derived from bituminous sand may contain relatively high proportions of fine solids, e.g. on the order of 150 to 200 mesh silt. It is also within the scope of the invention to utilize non-suspended solids such as fixed bed catalyst within the reaction vessel. In general, if suspended catalyst or other solids are present in the reaction vessel, the weight of the suspended catalyst must be subtracted from the available driving force due to density difference in calculating the recycle rate obtainable. In the case of non-suspended catalyst such as fixed bed catalyst, the pressure drop through the catalyst bed should, of course, be considered. When suspended solids are present but are not recycled, up to about 25% by volume of the reactor space may generally be occupied by suspended solids. In this context reactor space should be taken as that portion of the reaction vessel which the catalyst might occupy below the point of entry into the recycle line. For instance, in the form of apparatus shown in the drawing, reactor volume for this purpose would be the volume of the reaction vessel 13 from the bubble cap plate 17 up to the upper edge of the lip 27 of the disengaging member 22a. If suspended solids are recycled, the upflow velocity of the liquid-solid-gas mixture in the reaction zone should be sufficient to expand the solids bed or to carry up entrained solids to the point where solids are carried over into the recycle line with liquid. While any suitable sized solids may be utilized, solids of a size on the order of 100 microns or smaller are frequently used since they will recycle under any normal operating conditions in sufficient concentration and will not normally interfere with recycle of the liquid at desirable recycle rates.

*Example*

The following specific example illustrates a practical application of the present invention using a process and apparatus similar to that shown in the drawing. For this run the feed was a heavy crude oil derived from bituminous tar sand and having the following properties:

| | | |
|---|---|---|
| Gravity | °API | 8.2 |
| Sulfur | wt. percent | 4.6 |
| Distillation: | | |
| 400–680° F | vol. percent | 22.3 |
| 680–975° F | do | 26.7 |
| Above 975° F | do | 51.0 |

This feed was introduced into the reaction vessel together with 3,600 standard cubic feet of hydrogen per barrel of feed. The hydrogen was introduced in the form of a hydrogen-containing recycle gas stream containing approximately 77 volume percent hydrogen. The reaction vessel was a pilot plant unit with an 8 inch internal diameter and a height of 8 feet. The recycle conduit was 1¾ inches in diameter and had an enlarged gas disengaging zone similar to the zone 22 at its upper end. The gas disengaging zone had an area .68 times the cross sectional area of the reactor. This allowed a liquid recycle ratio of 20 times the liquid feed rate. The bottom of the reactor was maintained at a temperature of 835° F. by controlling the temperature of the incoming liquid feed while the upper portion of the reaction vessel rose to a temperature of 837° F. For this run the reaction vessel was maintained at a total pressure of 2,000 p.s.i.g., a hydrogen partial pressure of 1,500 p.s.i.g. and a space velocity of 0.95 volume of liquid feed per hour per volume of reactor space. Inspection of the liquid product removed from the reaction vessel revealed the following properties:

| | | |
|---|---|---|
| Gravity | °API | 19.1 |
| Sulfur | wt. percent | 2.5 |
| Distillation: | | |
| $C_1$–$C_3$ | vol. percent | 2.1 |
| $C_4$–400° F. | do | 17.6 |
| 400–680° F. | do | 45.6 |
| 680–975° F. | do | 25.4 |
| Above 975° F. | do | 14.9 |

While the invention has been described above with respect to a preferred embodiment thereof, it will be understood by those skilled in the art that various changes and modifications of both process and apparatus may be made without departing from the spirit and scope of the invention and it is intended to cover all such changes and modifications in the appended claims.

We claim:

1. Apparatus comprising a generally vertical reaction vessel, means for introducing liquid and gaseous feed into the lower portion of said vessel, a generally vertical recycle conduit positioned within said vessel, said conduit having an enlarged upper end in fluid communication with the upper portion of said reaction vessel and an open lower end in fluid communication with the lower portion thereof, said conduit having a cross-sectional area between about $\frac{1}{50}$ and about $\frac{1}{10}$ that of the reaction vessel and said enlarged upper end of said conduit having a cross sectional area at least about 0.2 times that of the reaction vessel and being spaced horizontally from the walls thereof, and means for withdrawing material from said vessel.

2. Apparatus for the treatment of liquid with gas comprising a generally vertical treating vessel, means for introducing liquid and gas into the lower portion of said vessel, means for withdrawing gaseous and liquid products from the upper portion of said vessel, a generally vertical recycle conduit positioned within said vessel, the lower portion of said conduit being in fluid communication with the lower portion of said vessel and the upper portion of said conduit having an enlarged upper portion in fluid communication with the upper portion of said vessel, said conduit having a cross-sectional area between about $\frac{1}{50}$ and about $\frac{1}{10}$ that of the treating vessel and said enlarged upper portion of the conduit having a cross-sectional area at least about $\frac{1}{5}$ that of the treating vessel and being spaced from the walls thereof, and shielding means associated with the lower end of said conduit adapted to prevent entry of gas into said lower end of the conduit.

3. Apparatus according to claim 2 in which the shielding means comprises a generally cup shaped member having an upper edge extending above the lower end of said conduit and externally concentric therewith.

4. Apparatus according to claim 2 in which the enlarged upper end of the recycle conduit comprises a generally funnel shaped member having a vertically upwardly extending upper lip at the upper periphery thereof.

References Cited in the file of this patent

UNITED STATES PATENTS

| | | |
|---|---|---|
| 1,613,531 | Pfisterer | Jan. 4, 1927 |
| 2,102,548 | Stratford | Dec. 14, 1937 |
| 2,607,662 | Huff | Aug. 19, 1952 |
| 2,962,434 | Pohlenz | Nov. 29, 1960 |
| 2,968,614 | Brooks et al. | Jan. 17, 1961 |